United States Patent [19]

Mac Iver et al.

[11] Patent Number: 4,540,636

[45] Date of Patent: Sep. 10, 1985

[54] METAL BEARING ELEMENT WITH A SCORE-RESISTANT COATING

[75] Inventors: Bernard A. MacIver, Lathrup Village; James C. Erskine, Jr., Birmingham; John C. Bierlein, Washington, all of Mich.

[73] Assignee: General Motors Corporation, Detroit, Mich.

[21] Appl. No.: 565,395

[22] Filed: Dec. 27, 1983

[51] Int. Cl.$^3$ .............................................. B32B 5/14
[52] U.S. Cl. ........................................ 428/610; 148/4; 428/653; 428/627
[58] Field of Search ...................... 428/610, 653, 627; 148/4

[56] References Cited

U.S. PATENT DOCUMENTS

| | | | |
|---|---|---|---|
| 1,834,746 | 12/1931 | Short | 428/610 |
| 2,304,371 | 12/1942 | Queneau et al. | 428/610 |
| 3,900,636 | 8/1975 | Curry | 148/4 |
| 3,926,636 | 12/1975 | Barzynski et al. | 204/159.14 |
| 3,989,524 | 11/1976 | Palac | 29/25.15 |
| 4,018,937 | 4/1977 | Levine et al. | 427/43 |
| 4,068,018 | 1/1978 | Hashimoto et al. | 427/38 |
| 4,078,098 | 3/1978 | Cortellino | 427/43 |
| 4,087,569 | 5/1978 | Hatzakis | 427/43 |
| 4,211,834 | 7/1980 | Lapadula et al. | 430/326 |
| 4,321,317 | 3/1982 | MacIver | 430/5 |
| 4,410,611 | 10/1983 | MacIver | 430/5 |

OTHER PUBLICATIONS

W. D. Oldham, Sci. Amer., 237, No. 3, pp. 111-114; 119-124; 126, 128, Sep. 1977.
Y. Okuyama et al., J. Electro. Chem. Soc., 125, No. 8, pp. 1293-1298, Aug. 1978.
B. LeBoss, Electronics, pp. 44, 46, Sep. 23, 1979.
S. Fujimori et al., Japanese J. Applied Physics, 20, No. 3, pp. L194-L196, Mar. 1981.
H. Vora et al., J. Applied Physics, 52, No. 10, pp. 6151-6157, Oct. 1981.
Lars-Peter Anderson, Thin Solid Films, 86, pp. 193-200, 1981.
B. A. MacIver, Research Publication, 9MR-3690.
B. A. MacIver, J. Electro. Chem. Soc., 129, No. 4, pp. 827-830, Apr. 1982.
J. C. Bierlein, Research Publication, 9MR-3063.
J. C. Bierlein, Proceedings National Conf. Power Transmission, Triple Engineering Show & Conf. VI, pp. 51-57, Chicago, Ill., Nov. 12, 1979.

*Primary Examiner*—Veronica O'Keefe
*Attorney, Agent, or Firm*—Robert J. Wallace

[57] ABSTRACT

A bearing element having an adherent score-resistant coating on its surface comprising a carbonized layer of an organic resin in which the layer is carbonized by ion implantation. The ion implantation is controlled to not only provide graphite-like and diamond-like structures in the carbonized coating but to also produce chemical bonding between carbon atoms of the resultant coating and atoms of the bearing surface.

1 Claim, No Drawings

METAL BEARING ELEMENT WITH A SCORE-RESISTANT COATING

FIELD OF THE INVENTION

This invention relates to an adherent score-resistant coating for metals. More specifically it involves an improved antifriction coating for bearing surfaces

BACKGROUND OF THE INVENTION

When metallurgically compatible metal surfaces are rubbed together, the metal of one surface can metallurgically, i.e. chemically, bond to the metal of the other surface. Such action, for example, is the basis for friction welding and cold welding. The bond, of course, can be as strong as the metal itself. If one attempts to slide the two surfaces on one another after even minute surface areas are so bonded, the sliding action can cause metal to be pulled away from one of the surfaces. When the metal is pulled away from the surface, that surface is considered galled. The mating surface then has a corresponding bump on it that can produce further galling, or even scuffing and scoring. We refer to such action generally as wear. In any event, sliding movement of the two surfaces will cause friction between them to increase. When friction is extreme, bearing surfaces can even seize together. The rate at which this will occur will, of course, vary with pressure applied during the sliding, surface compositions, surface roughness, etc.

To prevent such problems, one approach is to provide an antifriction and/or score-resistant coating on one or both of the mating metal surfaces. We have found a coating that is highly effective as an antifriction or score-resistant coating on metal surfaces, particularly iron-based alloy surfaces in contact with metallurgically compatible metal surfaces. The coating is hard, tenacious and distinctive. Moreover, it is formed by an unusual process.

OBJECTS AND SUMMARY OF THE INVENTION

It is an object of this inventivon to provide an improved article of manufacture that includes a bearing surface having an adherent layer thereon formed of an organic resin carbonized by ion implantation.

Another object of the invention is to provide a bearing element having an antifriction coating with graphite-like and diamond-likë crystallites therein and the coating chemically bonded to the bearing surface.

Another object of the invention is to provide a method for forming an adherent score-resistant coating on metals, especially iron based alloys, by a distinctive ion implantation technique.

Our invention comprehends preparing a bearing surface by coating a metal substrate surface with a film of a sulfur-free organic resin, and implanting ions into the coating by ion bombardment. This ion implantation is initially done at a first energy selected to both carbonize the coating and reduce its thickness at least about 50%. Thereafter, ion implantation is continued at a lesser energy to target the ions to produce maximum implantation damage to chemical bonds at the interface between the coating and the substrate surface. Implantation is continued at the lesser energy for a sufficient duration to completely decompose the organic resin into substantially pure carbon, and to bond the resulting carbon atoms to themselves and to the substrate surface. In the resultant product, we have observed evidence of graphite-like and diamond-like crystalline forms in the bulk of the coating and chemical compounds of carbon and the metal in the coating-substrate surface interfacial zones. In addition, when silicon ions are the implantation ion species, silicon carbide forms appear.

Other objects, features and advantages of this invention will become more apparent from the following description of preferred examples thereof.

DESCRIPTION OF THE PREFERRED EMBODIMENTS

The method of carbonizing a sulfur-free organic resin to provide a hard, adherent coating is not new. It has been used to make high density integrated circuit masks for exposure to deep ultra-violet light. U.S. Pat. No. 4,410,611 to B. A. MacIver claims the method of carbonizing needed to make such a mask. U.S. Pat. No. 4,321,317 to B. A. MacIver claims a unique photolithographic process using such a mask to make high density integrated circuits. In substance, MacIver found that if a photoresist was first ion implanted to reduce its thickness and then ion implanted to bond it in place, a tough, adherent coating was produced that was substantially opaque to deep ultraviolet light. It thus permitted one to avoid an undesirable and costly photoetching step when making integrated circuit photomasks.

In this invention, we recognize that the MacIver ion implantation process produces a film that also has utility as a score-resistant coating on metal surfaces, particularly surfaces that are in sliding contact with one another, i.e. bearing surfaces. We find that the MacIver process produces a coating of substantially pure carbon that appears to have graphite-like and diamond-like microcrystals therein, to make the coating not only low in friction but hard. We refer to such a coating as carbonized. Morever, we believe we can use the MacIver process to actually chemically bond the carbonized coating to the underlying metal surface, to make a coating that is extremely adherent. The result is a tenacious score-resistant coating.

On the other hand, we have discovered that this coating is only useful on a surface of metallurgically, or chemically, compatible metal. By that we mean a metal which will form chemical compounds with carbon. We believe that covalent carbon-metal bonds are established in coating-substrate interfacial zones that provide the extreme adherence of the coating. This chemical, or metallurgical bonding, is an especially important attribute, that makes the coating function as well as it does in this invention. Further, we have found that to be effective as a score-resistant coating, the bearing surface must be quite smooth, as for example 8 microinches roughness average or less for coating thicknesses less than about 0.2 micrometer. A surface roughness average of less than about 4 microinches (0.1 micrometer), preferably 2-3 microinches (0.05-0.075 micrometer), is generally desired for the bearing surface. In substance, we have found that if a surface is of the right metal and if it is smooth enough, the MacIver integrated circuit process can be used to make a score-resistant coating.

In a specific example of this invention, a 0.6 micrometer thick coating of polymethyl methacrylate (PMMA) positive-type electron resist was applied to the standard General Motors Corporation production cast iron working face of a valve lifter for an internal combustion engine. The electron resist is the same sulfur-free organic resin MacIver describes using in the aforementioned integrated circuit patents. We choose to use it for convenience, as will hereinafter be more fully explained. The resist coating was applied in essentially the same way MacIver describes for integrated circuit manufacturing processes. A drop of the photoresist was placed on the foot of the valve lifter and the valve lifter then axially spun to remove excess photoresist. With its working face up and horizontal, the valve lifter was baked in air at about 80° C. for about 30 minutes, to drive off excess resist solvent. The coating working face of the valve lifter body was then given a uniform ion implantation across its entire working face, i.e. foot, using $^{28}Si^+$ at an energy of approximately 200 keV and a flux of 3 microamperes per square centimeter in a dosage of $3 \times 10^{15}$ silicon ions per square centimeter. We prefer silicon ions because they provide an incidental benefit, as will become more apparent. This implantation was at an energy sufficient to cause the silicon ions to completely penetrate the resist coating. In fact, we prefer that the ions penetrate into the metal surface far enough at the very start of this implantation to cause maximum energy deposition and hence damage to occur at the coating-metal interface right at the outset. We will explain more on this point later.

The foregoing implantation caused the organic resin coating to shrink in thickness from its original 0.6 micrometer thickness to about 0.16 micrometer. The coating was apparently carbonized to a considerable extent and bonded to some extent. However, it apparently was not bonded well enough to the underlying metal face to be scratch-resistant.

The entire coated working face of the valve lifter was then given a second uniform implantation with $^{28}Si^+$. However, this time the implantation energy was at 150 keV at a flux of 3 micrometers per square centimeter and in a dosage of $5 \times 10^{15}$ silicon ions per square centimeter. The organic resin coating shrank in thickness only slightly, to about 0.15 micrometer, and became highly scratch-resistant.

The static and kinetic coefficients of friction of the valve lifter's coated working face were then measured under both dry and lubricated conditions. They were measured by placing the coated working face of the valve lifter, which had a surface roughness average of about 5 microinches (0.125 micrometer), on a horizontal flat ground steel surface, which also had a surface roughness average of about 5 microinches (0.125 micrometer). To determine the static coefficient of friction, the lateral force needed to overcome the lifter's surface contact forces and cause the lifter to start to slide across the steel surface was measured. It was first measured without an oil film on the steel surface, and then with one. The same test was made with a similar valve lifter that did not have the score-resistant coating on its working face. In the latter sample, the working face of the similar valve lifter had a surface roughness average of about 4 microinches (0.1 micrometer). The uncoated working face had a static coefficient of friction of 0.22 in the dry test and 0.27 in the lubricated test. The coated working face had a static coefficient of friction of 0.15 in the dry test and 0.19 in the lubricated test. Accordingly, the percent reduction in friction coefficient was 32% dry and 30% lubricated.

The kinetic coefficient of friction was analogously measured on both of the aforementioned samples under both dry and lubricated conditions. The kinetic coefficient of friction was measured by measuring the lateral force necessary to keep the valve lifter sliding across the horizontal steel surface after it has been given a push to get started. As in the preceding test, the valve lifter rested on the flat ground steel surface with its working face contacting the steel plate. The kinetic coefficient of friction for the coated working face was 0.15 when the steel surface was dry, and 0.16 when it had an oil film on it. The coefficient of friction for the valve lifter with the uncoated working face was 0.18 when the steel surface was dry, and 0.17 when it had the oil film on it. This represented a 17% reduction in kinetic friction dry and 6% reduction in kinetic friction lubricated.

This invention was also tested using an unetched SAE 390 aluminum alloy slider in a typical type of friction and score test apparatus. The apparatus used in this test is described by John C. Bierlein in his paper entitled "Measurement of Plain Bearing Material Score Resistance" that was published in the *Proceedings of the National Conference on Power Transmission*, Triple Engineering Show & Conference, volume VI, pages 51–57, Chicago, Ill., Nov. 13, 1979. In this test the slider is placed in contact with the axial face of a flat steel disk rotating at a constant velocity. The steel disk had a surface roughness average of about 4 microinches (0.1 micrometer). Kerosene was used as a fluid lubricant between the slider and the disk face during the test. In this test the force pressing the slider and disk face together is increased linearly with time, while maintaining the predetermined constant disk rotation. The torque needed to maintain the slider in fixed position is used as a measure of friction between the slider and disk face. When the disk face was coated with the score-resistant coating of this invention, no significant increase in friction was observed even at the end of a normal test force cycle for this apparatus. On the other hand, when the same test was performed with an uncoated disk, the test failed catastrophically after only about 15% of the test force had been applied. By catastrophic, we mean that the slider seized on the disk, and the force needed to maintain the slider in fixed position increased drastically. It is of interest to note that very few prior antifriction coatings have exceeded the limits of this test apparatus. On the other hand, the foregoing results have been repeatedly obtained with other disks coated in accordance with this invention.

As previously mentioned, the integrated circuit resist PMMA was used to produce the organic resin coating that is implanted in this invention. We do believe that any methacrylate resist can be used but that the invention is not limited to resists of that type. For example, we believe this invention can be used on any sulfur-free resist, as for example polymethyl isopropenyl ketone (PMIK), Shipley's AZ-1350, Tokyo Oka Kogyo's OMR-83 or OSR, hexafluorobutyl methacrylate (HFBM), methyl methacrylate (MMA) or poly (alpha-methyl styrene) prepared by plasma polymerization (alpha-MS). For the reasons mentioned in the following paragraph we believe that many organic resins can be used. The only exception identified so far is that the resin should not contain any appreciable amount of sulfur. In essence, we want a resin that will leave a carbon deposit when decomposed by ion implantation.

We further believe that this invention is applicable to any sulfur-free organic resin that can be applied in thicknesses of 0.5–1.0 micrometers. At least 0.5 micrometer generally is needed in order to insure one obtains a continuous film. More than about 1.5 micrometers cannot be used because of the ion implantation energy required to penetrate it. Such equipment is simply not commercially available. On the other hand, we would prefer to employ as large a thickness as we can to get maximum wear resistance. In general this means using an initial coating thickness of about 1.0 micrometer, to insure the coating will be completely penetrated in the first implantation. On the other hand, if ion implantation equipment of a power greater than about 200–250 keV becomes available, we would, of course, want to increase the thickness of the film. In fact, we would prefer to use the maximum thickness that can be penetrated in the first implantation by the available ion implantation equipment.

Coating uniformity is important in targeting the ions. The organic resin coating should be applied highly uniformly, to permit uniform ion implantation maximum damage along the entire resin-metal interfacial area. This provides most uniform bonding along the entire interface. Hence, we believe that any organic resin can be used that will form a uniform thickness film of 0.5–1.5 micrometers and will carbonize under the implantation we described. As a matter of convenience, the most readily available materials that we know of that will produce such films reliably are used in integrated circuit manufacturing resists. That is why we prefer using them.

From the foregoing it should be apparent that we prefer to use the largest practical energy we can in the first implantation, to permit us to use the thickest possible starting thickness in the organic coating. Energies of at least about 180 keV are contemplated for the first implantation. In any event it must be of sufficient power to provide an implantation range of the selected ion species that is as far as the coating is thick. By range we mean the average depth of penetration of the implanted ions. It appears important even in this first implantation, that the average implanted ion at least reach the coating-metal interface, or adhesion in the resultant coating will not be maximum. Maximum adhesion is insured if the range is targeted to produce maximum damage, i.e. ion mixing which promotes the formation of new chemical bonds, precisely at the coating-metal interface. It would seem that this targeting is more important to the second implantation. However, it appears of some importance in the first implantation too, perhaps to provide some initial bonding before the coating starts to decompose. We prefer that the implantation be conducted at a sufficiently rapid rate, i.e. flux, of at least about 2 microamperes per square centimeter and preferably higher.

Both the first and second implantation coincidentally must not only be at high energies and fluxes but also at dosages of at least about $1 \times 10^{15}$–$5 \times 10^{16}$ ions per square centimeter for initial resin thicknesses of 0.5–1.0 micrometers. The first implantation should have a dosage high enough to reduce the thickness of the organic resin to at least about 50%, and preferably to about 25%, of its original thickness. Then the second implantation will cause little, if any, additional shrinkage. If the second implantation does not cause any significant shrinkage, ions can remain targeted for maximum damage at the coating-metal interface during the entire second implantation, not just a part of it. In summary, the dosage needed in the first implantation is related to starting resin film thickness. Why a dosage of at least about $1 \times 10^{15}$ atoms per square centimeter also seems to be needed to get satisfactory coating-metal bonding is not clearly understood. In any event, dosages in excess of $5 \times 10^{16}$ atoms per square centimeter do not appear to provide added benefits in either the first or second implantation, and may even be objectionable.

It has been mentioned that the energy of both the first and second implantations should be targeted to provide maximum damage at the resin coating-metal interface. By maximum damage, we mean the maximum damage to lattice structures, i.e. atomic displacement or interfacial atom mixing at the coating-metal interface. Such damage is typified by vacancies being produced in a crystal lattice or atoms being moved into interstitial positions in the crystal lattice. We believe that when this action occurs from impact of the bombarding ions, their momentum is transferred to atoms of a material lattice which they hit, permitting the formation of new bonding relationships. The first implantation not only decomposes the organic resin into substantially pure carbon (plus the implanted ion species) but also apparently forms new carbon-to-carbon relationships. For example, X-ray diffraction studies show evidence of both graphite-like and diamond-like crystalline forms in the resultant coating when dosages of at least $1 \times 10^{15}$ atoms per square centimeter are used in both the first and second implantations. The coating has both amorphous and polycrystalline graphite structures that incorporate diamond-like structures with particle sizes being typically less than 50 nanometers. Presumably, both the graphite-like and the diamond-like crystalline microstructures are incidentally formed during both the first and second implantations.

We believe that coating attributes are further enhanced by using silicon as the implant ion species. The silicon is metallurgically compatible with the carbon and produces microstructures of silicon carbide in situ. Silicon is also metallurgically compatible with metals such as iron, aluminum and copper.

It should be mentioned that maximum ion implantation damage is produced at about 60–80% of the ion implantation projected range. As used herein, ion implantation projected range means the average depth of penetration of the ion species in the coating and the metal. We believe that the place where maximum damage occurs will be the place where most new chemical relationships will form. In other words, by targeting the zone of maximum damage to be at the coating-metal interface, we maximize formation of the carbon-to-metal bonds, and thus maximize adhesion of the resultant coating to the metal surface.

As indicated above, the second implantation is performed at an energy level targeted to produce maximum damage at the coating-metal interface to promote chemical bonding between the carbon produced in the coating and metal surface atoms. This carbon-metal bonding produces an interjacent zone of carbon-metal compounds which tenaciously bond the coating to the underlying metal surface. Dosages in excess of about $5 \times 10^{15}$ atoms per square centimeter do not provide any enhanced bonding. In fact, in some instances it would appear that dosages in excess of this amount may produce poorer results, perhaps by a sputtering etching effect on the carbon atoms.

It should be understood that the transfer of energy provided by the ion bombardment of this invention is not critically dependent upon any particular ion species. On the other hand, one should select an ion species that is metallurgically compatible with the carbon-metal system involved. By that we mean the ion does not disrupt desired chemical relationships, and preferably enhances them, as for example by forming chemical compounds. For example, silicon ions can form compounds with both carbon and iron. Ordinarily one would want to use an ion species that has a low molecular weight and still be compatible in the system involved. In some instances an ion species would be considered metallurgically compatible because it is normally a gas, such as argon, neon, etc., and forms volatile compounds or no compounds, so that these ions can be annealed away. Other ion species that will carbonize an organic resin coating and high adhesion on metals such as iron-based alloys are phosphorus ions, argon ions, boron ions, and boron difluoride ions. I expect that nickel ions, nitrogen ions, and carbon ions would also be suitable, depending upon the metal or alloy.

We believe this coating can be formed on many metals, such as iron-based alloys and aluminum-based alloys. By iron-based alloys, we mean any metal containing over 50% by weight iron. By aluminum-based alloys, we mean a metal containing over 50% by weight aluminum. When used on aluminum alloys, however, we believe that the primary use would be in light unit load applications. Under heavy unit loads, the aluminum surface supporting the coating may tend to deform, which probably reduces effectiveness of the coating.

We believe that our coating wears little. On the other hand, it is so thin, i.e. about 0.1–0.2 micrometer, that even a little wear can be a problem if concentrated in location. We have found that this coating works quite well as an antifriction or score-resistant coating when its supporting metal surface is quite smooth. By that we mean that the metal surface has a roughness average of less than about 8 microinches. In fact, we prefer that the metal surface have a roughness average no greater than about 4 microinches (0.1 micrometer). Best results have been obtained when surfaces were no rougher than about 2–3 microinches average (0.05–0.075 micrometer). In retrospect, it appears that when our coating is used on rough metal surfaces, it tends to wear away at high points on the rough surface. This action causes the underlying metal surface to lose the protection afforded by the coating. Accordingly, if our coating could be produced in thicknesses greater than about 0.1–0.2 micrometer, presumably the surface supporting it could probably be rougher. For example, for a coating thickness of 0.4 micrometer, a surface roughness average of about 10–12 microinches (0.25–0.3 micrometer) might be acceptable.

It should also be mentioned that we consider this process as one in which targeting of ion implantation maximum damage is maintained at the coating-metal surface interface by reducing the ion implantation energy in a second step. It should be recognized that one can effectively accomplish the same result in a series of steps or that one can continuously reduce implantation energy so as to continuously maintain maximum damage at the coating-metal surface interface.

While this invention has been described in connection with producing an adherent antifriction coating on the working face of an automotive valve lifter body, it can be used in any application where there is a sliding contact between two mating surfaces, provided that at least the coated surface, and preferably both surfaces, is sufficiently smooth. This coating can be used on piston and other seal rings, cam surfaces, spool valves, axles, and pivot points. It is of particular interest as a coating on iron-based alloy surfaces to reduce friction when those surfaces are moved against ductile metal surfaces, such as those of aluminum-based alloys and copper-based alloys. It may even prove to be effective when the other metal surface is also an iron-based alloy. This invention is expected to be useful in such applications, particularly when the coating is on an iron-based alloy moving in contact with aluminum-based alloy surfaces.

The emodiments of the invention in which an exclusive property or privilege is claimed are defined as follows:

1. A bearing element having and adherent, hard, antifriction coating thereon, wherein the bearing element has a surface consisting essentially of an iron-based alloy for sliding contact with metals, such as aluminum based alloys, a carbonized layer thereon of a sulfur-free methacrylate-type resin that contains silicon carbide, graphic-like and diamond-like crystalline microstructures therein, and an interfacial zone between the carbonized coating and the iron-based alloy surface containing chemical compounds of iron and carbon that bond the carbonized coating to the iron-based alloy surface.

* * * * *